US012739232B2

(12) United States Patent
Feldpusch

(10) Patent No.: US 12,739,232 B2
(45) Date of Patent: Sep. 15, 2026

(54) SYSTEMS AND METHODS FOR SECURED NETWORK INFORMATION TRANSMISSION

(71) Applicant: Level 3 Communications, LLC, Denver, CO (US)

(72) Inventor: Michael Feldpusch, Murrells Inlet, SC (US)

(73) Assignee: Level 3 Communications, LLC, Denver, CO (US)

( * ) Notice: Subject to any disclaimer, the term of this patent is extended or adjusted under 35 U.S.C. 154(b) by 105 days.

(21) Appl. No.: 18/913,288

(22) Filed: Oct. 11, 2024

(65) Prior Publication Data

US 2025/0150439 A1 May 8, 2025

Related U.S. Application Data

(60) Provisional application No. 63/595,891, filed on Nov. 3, 2023.

(51) Int. Cl.
*H04L 29/06* (2006.01)
*H04L 9/40* (2022.01)

(52) U.S. Cl.
CPC ........ *H04L 63/029* (2013.01); *H04L 63/0245* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 7,830,816 | B1 * | 11/2010 | Gonzalez | H04L 41/5009 370/252 |
| 7,885,207 | B2 * | 2/2011 | Sarkar | H04L 41/0213 370/254 |
| 8,074,270 | B1 * | 12/2011 | Lordello | H04L 45/52 726/13 |
| 8,660,129 | B1 * | 2/2014 | Brendel | H04L 12/4641 370/397 |
| 9,398,043 | B1 * | 7/2016 | Yang | H04L 63/1441 |
| 10,244,076 | B2 * | 3/2019 | Sivasankaran | H04L 45/745 |
| 10,250,442 | B2 * | 4/2019 | Osborne | H04L 41/0895 |
| 10,791,004 | B2 * | 9/2020 | Jain | H04L 45/586 |
| 10,999,251 | B2 * | 5/2021 | Miriyala | H04L 41/0806 |
| 11,095,517 | B2 * | 8/2021 | Chunduru Venkata | H04L 41/0894 |
| 11,470,104 | B1 * | 10/2022 | Chamorro | H04L 63/0272 |

(Continued)

OTHER PUBLICATIONS

International Search Report and Written Opinion of the International Searching Authority, dated Jan. 16, 2025, Int'l Appl. No. PCT/US2024/051014, Int'l Filing Date Oct. 11, 2024, 14 pgs.

*Primary Examiner* — Maung T Lwin

(57) ABSTRACT

The present application describes systems and methods for secured network information transmission. A network tunnel may be established from a customer premises equipment (CPE) to a routing device at a provider site. The network tunnel may traverse over one or more networks while maintaining a secure path for data. A customer may indicate a chosen configuration for a CPE, and a device at a provider site, a customer device, and/or the CPE itself may automatically, or manually, configure the CPE based on the chosen configuration to allow and/or disallow certain customer network information from being received and/or transmitted through the network tunnel.

18 Claims, 5 Drawing Sheets

(56) References Cited

U.S. PATENT DOCUMENTS 11,784,875 B1 * 10/2023 Sundararajan ...... H04L 41/0806 709/220
11,792,119 B2 * 10/2023 Tandon ................ H04L 45/586 709/238
2020/0106744 A1 * 4/2020 Miriyala ............... H04L 43/026
2020/0186427 A1 6/2020 Chunduru Venkata
2022/0201033 A1 * 6/2022 Shapira ............... H04L 63/1458
2023/0093915 A1 * 3/2023 Rotkop ................ H04L 45/021 726/1
2023/0300158 A1 9/2023 Chamorro

* cited by examiner

SYSTEMS AND METHODS FOR SECURED NETWORK INFORMATION TRANSMISSION

CROSS-REFERENCE TO RELATED APPLICATIONS

This application claims the benefit of U.S. Provisional Application No. 63/595,891 filed Nov. 3, 2023, entitled "Systems and Methods for Secured Network Information Transmission," which is incorporated herein by reference in its entirety.

BACKGROUND

Customers may transmit sensitive customer network information to a network provider, but the journey these data packets may take across various networks (e.g., public networks) may expose them to potential security risks. This may be especially true in environments where multiple networks, each with different security levels and controls, are involved. It is with respect to this general technical environment that aspects of the present application are directed.

SUMMARY

The present application describes systems and methods for secured network information transmission.

For example, aspects of the present application include a method comprising: establishing a network tunnel from a customer premises equipment (CPE) to a virtual router located at a provider site; providing a configuration interface accessible to a customer device; receiving, at the configuration interface, one or more selections of customer network information to be communicated over the network tunnel; automatically configuring the CPE based at least in part on the one or more selections; and receiving customer network information from the CPE through the network tunnel at the virtual router based at least in part on the configured CPE.

In some examples, the method further comprises receiving, at the provider site, the one or more selections, wherein the automatically configuring of the CPE is performed by a provider site. In some examples, the automatically configuring of the CPE is performed by the customer device. In some examples, the method further comprises transmitting a query from the virtual router through the network tunnel to the CPE based at least in part on the configured CPE, wherein the receiving comprises receiving the customer network information from the CPE through the network tunnel at the virtual router based at least in part on the query. In some examples, receiving customer network information from the CPE comprises receiving customer network information over a plurality of networks, and wherein the receiving comprises a one-hop communication over the plurality of networks. In some examples, receiving customer network information from the CPE comprises receiving customer network information comprising at least one of network packet header information, simple network management protocol (SNMP) information, or interface statistics. In some examples, establishing the network tunnel network further comprises configuring the network tunnel with an internet protocol security (IPSec) framework. In some examples, the method further comprises providing the received customer network information from the virtual router to one or more security systems, wherein the one or more security systems comprise at least one of management systems, network packet header information collection systems, or analytics systems. In some examples, the method further comprises providing a key for the network tunnel to the customer device, wherein the receiving the customer network information is based at least in part on providing the key. In some examples, establishing the network tunnel further comprises determining a first internet protocol (IP) address for the network tunnel corresponding to the virtual router, determining a second IP address for the network tunnel corresponding to the CPE, and determining a third IP address for the network tunnel corresponding to the network tunnel. In some examples, the method further comprises configuring a first port to receive a first type of customer network information; configuring a second port to receive a second type of customer network information; and dropping received customer network information that is not configured to be received by a port.

In another example, aspects of the present application include a method comprising: establishing a network tunnel between a customer premises equipment (CPE) and a virtual router, wherein the virtual router is located at a provider site; receiving a configuration indication indicating allowed customer network information, disallowed customer network information, or a combination thereof, for communication through the network tunnel; and receiving at least a portion of the allowed customer network information from the CPE through the network tunnel based at least in part on the configuration indication.

In some examples, the method further comprises providing a configuration interface to a customer device; receiving, at the configuration interface, one or more selections of customer network information to be communicated over the network tunnel; and automatically configuring the CPE based at least in part on the one or more selections, wherein receiving the configuration indication is based at least in part on the automatically configuring. In some examples, the automatically configuring of the CPE is performed by a provider site. In some examples, the automatically configuring of the CPE is performed by the customer device. In some examples, the method further comprises transmitting a query through the network tunnel to the CPE based at least in part on the configuration indication, wherein receiving the allowed customer network information is based at least in part on the query. In some examples, the query comprises a simple network management protocol (SNMP) poll, wherein the allowed customer network information comprises SNMP information, and wherein receiving the allowed customer network information is based at least in part on the SNMP poll. In some examples, the configuration indication indicates disallowing simple network management protocol (SNMP) queries to be provided from the provider site, and disallowing SNMP information to be provided from the CPE. In some examples, the method further comprises providing a key for the network tunnel to a customer device, wherein the receiving the allowed customer network information is based at least in part on providing the key.

In another example, aspects of the present application include a system comprising at least one processor; and a memory operatively connected to the at least one processor and storing instructions that, when executed by the at least one processor, cause the system to perform a method. In some examples, the method comprises: establishing a network tunnel from a customer premises equipment (CPE) to a virtual router at a provider site; providing a configuration interface accessible to a customer device; receiving, at the configuration interface, one or more selections of customer network information to be communicated over the network tunnel; automatically configuring the CPE based at least in part on the one or more selections; and receiving customer network information from the CPE through the network tunnel at the virtual router based at least in part on the configured CPE.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
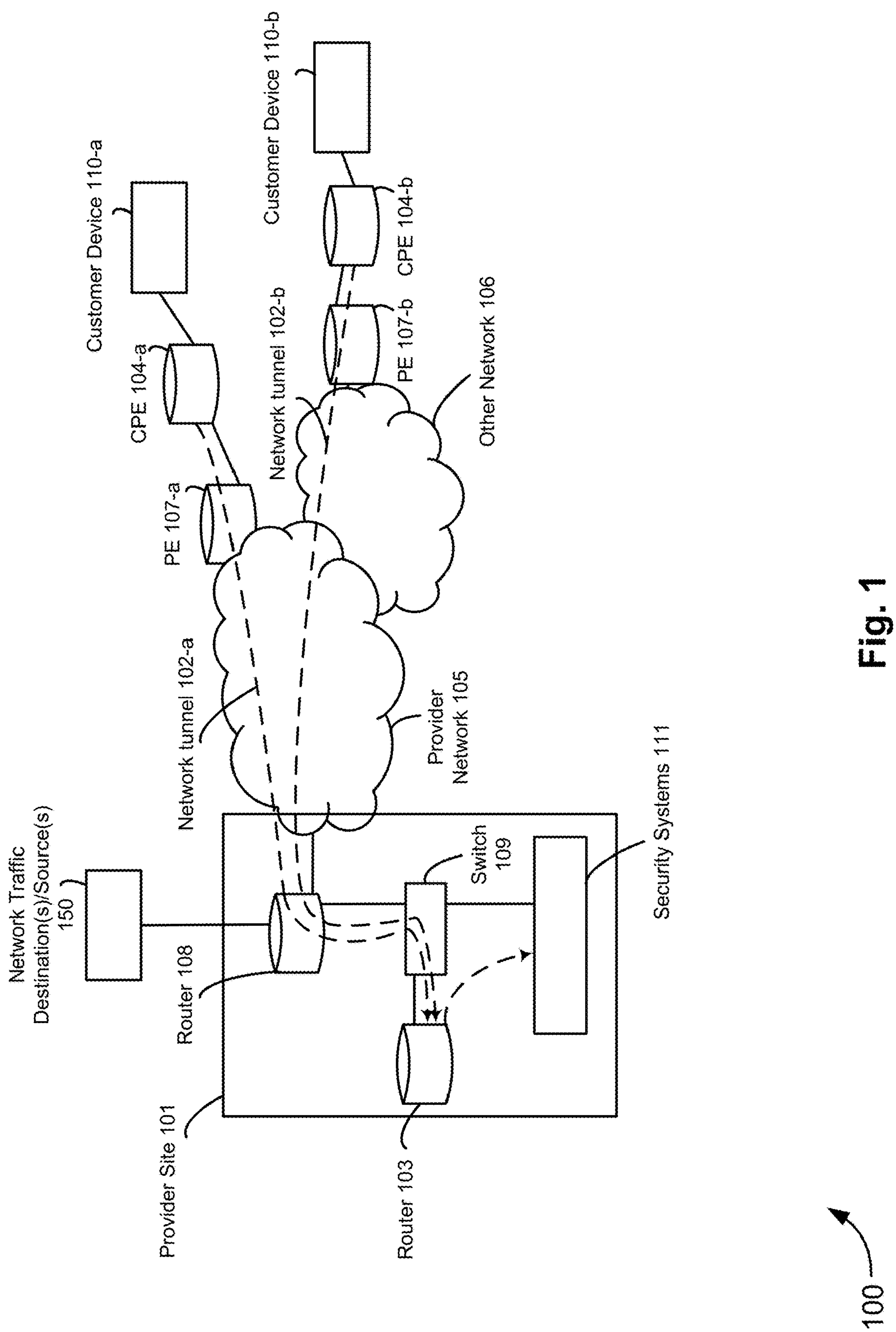
FIG. 1 is a block diagram depicting an example system according to aspects of the present application.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. In addition, all systems described with respect to the Figures can comprise one or more machines or devices that are operatively connected to cooperate in order to provide the described system functionality. The following detailed description is therefore not to be taken in a limiting sense, and the scope of the present disclosure is defined by the appended claims and their equivalents.

Network providers may desire to obtain certain networking and/or performance information from device(s) operating within customer networks. For example, a customer network may include customer devices that are connected to a provider network through customer premises equipment (CPE). A CPE may comprise a piece of network equipment (e.g. a modem/routing device) that is provided by the provider network to facilitate connection between the customer network (and devices thereon) and the provider network. In some examples, the customer network may be directly connected between the CPE and the provider network via an internet circuit that is provided by the provider network. Such customers may be considered "on-net." In other examples, the customer network may be connected to the provider network through a third-party network (e.g., a third-party ISP) such that data that is transceived between the customer network and the provider network also must travel across a third-party network. Such customers may be considered "off-net." In some examples, the customer network may be dual-homed (e.g., using two possible internet circuit connections to the provider network).

As discussed, it is sometimes desirable for the provider network to receive customer network information from the CPE (or customer devices connected thereto) so that the provider network can improve performance. For example, a customer device or CPE may provide network packet header information (e.g., Netflow information), simple network management protocol (SNMP) information, interface statistics, and/or any other information, to provider network. Receiving such customer network information may, in examples, enable the network provider to provide greater security functions to assist the customer and the provider network. However, network data transmitted and/or received across public networks is a growing concern for customers of a provider network. Customers may have security requirements in place for network information that is transmitted from the customer network, thus preventing the provider network from receiving such customer network information.

Examples described herein describe systems and methods for establishing a network tunnel from a CPE (e.g., a routing device, a telephone, a switch, a residential gateway (RG), a set-top box, a fixed mobile convergence product, a home networking adaptor, an internet access gateway, or the like) to a termination device (e.g., a routing device, a virtual router, or the like) at a provider site. The network tunnel may traverse over one or more networks (e.g., a public network) while maintaining a secure path for data.

Examples described herein additionally or alternatively describe systems and methods for configuring a CPE to allow and/or disallow various customer network information to be transmitted and/or received over the network tunnel. For example, some configurations may restrict some or all SNMP information and/or SNMP queries but may allow some or all network packet header information. A customer may indicate a chosen configuration for a CPE, and the provider network, a device at a provider site, a customer device and/or the CPE itself may automatically, or manually, or a combination of these, configure the CPE based on the chosen configuration.

FIG. 1 discloses an example system 100 according to aspects of the present disclosure. At least one device at provider site 101 may establish network tunnel 102-*a* between routing device 103 (e.g., a tunnel termination point, which may be a virtual router running via a hypervisor, or a physical routing device) and CPE 104-*a*. Additionally or alternatively, at least one device at provider site 101 may establish network tunnel 102-*b* between routing device 103 and CPE 104-*b*. In some cases, CPE 104-*a* may correspond to an on-net customer (e.g., using a network-provider internet circuit to connect to provider network 105, which may be a public network), and CPE 104-*b* may correspond to an off-net customer (e.g., using another network 106, which may be a public network, to provide an internet circuit to connect to provider network 105). In some examples, CPE 104-*a*, CPE 104-*b*, or both, may be a provider-owned device, a device approved by the provider (e.g., a customer-owned device approved by the provider), or any other device to which the provider has access. Provider network 105 may include one or more provider network devices, and other network 106 may include one or more other network devices, such as switches, routing devices, etc. Provider site 101 may comprise a data center of provider network 105. Provider network 105 may also operatively transceive network traffic to/from CPE(s) 104 and to/from network traffic destination(s)/source(s) 150 (which may be part of, or external to, provider network 105). It will be understood that all connections between systems depicted with respect to FIG. 1 can be wired or wireless and may include various intervening devices and systems.

In examples, it may be desirable for the provider network 105 to receive customer network information from the CPE(s) 104 (or customer devices connected thereto) so that the provider network 105 can improve performance. CPE may provide customer network information in the form of network packet header information (e.g., Netflow information), simple network management protocol (SNMP) information, interface statistics, and/or any other information, to provider network 105. In examples, the customer network information is metadata associated with the network traffic transceived to/from network traffic destination(s)/source(s) and to/from CPEs 104. Although it may be acceptable to customers that network traffic be transceived by provider network 105 without a secure tunnel, customers may institute security requirements that would prevent certain customer network information from being transmitted by devices on the customer's network (such as CPE 104 or customer device 110), thus preventing the provider network from receiving such customer network information. Examples provided herein permit a tunnel for customer network information to be configured and provided.

Establishing a network tunnel 102 may include determining one or more internet protocol (IP) addresses for the network tunnel 102. For example, at least one device at provider site 101 may determine an IP address for the network tunnel at the network tunnel termination point (e.g., at routing device 103), determine an IP address for the network tunnel at the network tunnel origination point (e.g., CPE 104-*a* or CPE 104-*b*), and may determine an IP address corresponding to the network tunnel itself (e.g., which may not be associated with a termination point or origination point). At least one device at provider site 101 may communicate with a CPE 104 to establish a network tunnel 104 between routing device 103 and the CPE 104. For example, routing device 103 may communicate with CPE 104-*a* to establish network tunnel 102-*a*, and routing device 103 may communicate with CPE 104-*b* to establish network tunnel 102-*b*. In some cases, network tunnels 102 may be initially configured as one-way network tunnels (e.g., transmitting customer network information from a CPE 104 to routing device 103) or two-way network tunnels (e.g., transmitting customer network information from a CPE 104 to routing device 103, transmitting queries for customer network information from routing device 103 to a CPE 104) (e.g., depending on the customer).

In some examples, at least one computing device at provider site 101 (e.g., routing device 103) may provide a communication to customer device 110-*a* or 110-*b* including a request for the IP address of the corresponding CPE 104-*a* or 104-*b* (e.g., if the CPE 104-*a* or CPE 104-*b* is not associated with, owned by, or approved by, the provider). The customer device 110-*a* or 110-*b*, or CPE 104-*a* or 104-*b*, may provide the IP address of CPE 104-*a* or 104-*b* to provider site 101. Provider site 101 may then be able to establish the corresponding network tunnel 102-*a* or 102-*b* between the corresponding CPE 104 and routing device 103 using the received IP address of the corresponding CPE 104. In other examples, the CPE 104 may be pre-programmed to send the IP address of the CPE to provider site 101 periodically, upon startup, or otherwise.

In some examples, provider site 101 (e.g., routing device 103) may provide a customer (e.g., a CPE 104, a customer device 110) (e.g., using an established corresponding network connection, or using any other infrastructure) a communication including information about the established network tunnel so the customer may be able to access the network tunnel. For example, the communication may include a secret or a key to access the corresponding network tunnel 102, an origination IP address for the network tunnel, a destination IP address for the network tunnel, and/or a third IP address corresponding to the network tunnel (e.g., but not associated with the origination or destination of the network tunnel). Using the received information, the customer (e.g., a CPE 104) may be able to access the corresponding network tunnel 102 in providing customer network information to the provider network 105.

Network tunnel 102-*a*, network tunnel 102-*b*, or both, may be configured with an internet protocol security (IPSec) framework. IPSec comprises a secure and encrypted method for securing traffic over the internet between two points (e.g., via network tunnels 102 between CPEs 104 and routing device 103). For example, provider site 101 may configure the network tunnel 102 with the IPSec framework (e.g., during or after establishing the network tunnel 102).

Customer network information flowing through network tunnel 102-*a*, network tunnel 102-*b*, or both, may traverse through one or more networks and/or devices. For example, customer network information provided from CPE 104-*a* to routing device 103 via network tunnel 102-*a* may traverse through provider edge (PE) 107-*a* (e.g., a routing device, or the like), provider network 105, routing device 108, and switch 109. In some other examples, customer network information provided from CPE 104-*b* to routing device 103 via network tunnel 102-*b* may traverse through PE 107-*b* (e.g., a routing device, or the like), other network 106, provider network 105, routing device 108, and switch 109. In some cases, network tunnels 102 may traverse over multiple other networks 106. Traversing multiple networks using a network tunnel 102 between routing device 103 and a CPE 104 may still constitute a one-hop communication to/from routing device 103 and the CPE 104. Other configurations of networks and devices between CPEs 104 and routing device 103 may be contemplated.

CPEs 104 may be communicatively coupled (e.g., connected) with one or more customer devices 110. For example, CPE 104-*a* may be communicatively coupled with customer device 110-*a*, and CPE 104-*b* may be communicatively coupled with customer device 110-*b*. Customer devices 110 may include smartphones, computers, or the like. Communicative coupling may be wired or wireless, or a combination of these. For example, customer devices 110 may access a wireless network provided by CPE 104 (if CPE 104 is a wireless network routing device, for example).

Provider site 101 may include one or more servers. In some examples, routing device 108, routing device 103, and security systems 111 may instantiated on different servers. In some other examples, any combination of routing device 108, routing device 103, and security systems 111 may comprise a server or servers (e.g., running one or more virtual machines). In some examples, provider site 101 may include or may be referred to as a data center.

Switch 109 may connect routing device 108, routing device 103, and security systems 111. Switch 109 may manage the flow of customer network information between such devices by transmitting received customer network information to one or more destination devices. For example, switch 109 may provide customer network information received from provider network 105 via network tunnel 102-*a* or network tunnel 102-*b* to routing device 103. In some examples, routing device 103 may provide customer network information received from CPEs 104 via a tunnel 102 to security systems 111 (e.g., through switch 109). Further, switch 109 may transceive network traffic to or from CPEs 104 and to/from network traffic destination(s)/source(s) 150.

Security systems 111 may process customer network information, may receive customer network information from routing device 103 and/or routing device 108 via switch 109, and may transmit information to routing device 103 and/or routing device 108 via switch 109. For example, security systems 111 may include a network management system, a network packet header information (e.g., Netflow) collection system, an analytics processing system, among other systems. Security systems 111 may process customer network information received from or that will be provided to network tunnels 102. Among other things, the security systems 111 may use the customer network information in performing (or instructing other computing elements to perform) certain security functions, such as filtering unwanted or untrusted network traffic to/from CPE 104. For example, during a detected distributed denial of service (DDoS) attack, a customer may direct that all network traffic to and/or from the customer device(s) 110 to/from network traffic destination(s)/source(s) 150 be scrubbed by scrubbing devices that are part of (or configured by) security systems 111. For example, router 108 may implement one or more filter(s) for network traffic to/from network traffic destination(s)/source(s) 150.

As discussed, customer network information may include network packet header information, SNMP information, and interface statistics, among other possibilities. CPEs 104 may use network tunnels 102 to provide or broadcast network packet header information (e.g., Netflow information) to provider site 101 (e.g., routing device 103). Network packet header information may include information about network traffic flows. For example, network packet header information may include a source IP address, a destination IP address, a source port number, a destination port number, information about which IP protocol is being used, type of service (ToS) information, performance metric information, a next-hop IP address, one or more ifIndex numbers, among other information, or a combination of these. Security systems 111 may use network packet header information received from CPE 104-*a*, CPE 104-*b*, or both, via network tunnel 102-*a*, network tunnel 102-*b*, or both, respectively, to detect distributed denial of server (DDOS) attacks, to determine trends in network traffic, or the like, and implement security precautions in provider network 105 accordingly (e.g., by instantiating or managing network filters, among other possibilities).

CPEs 104 may use network tunnels 102 to receive SNMP queries and/or provide SNMP information to an endpoint of provider site 101 (e.g., routing device 103). Using SNMP, a device of a provider site 101 (e.g., security systems 111, routing device 103, etc.) may be able to poll (e.g., query) CPE 104-*a*, CPE 104-*b*, or both, for information about the CPE 104 or its network. In some examples, the poll request (e.g., query) may be provided to the CPE 104 via a network tunnel 102. For example, provider site 101 (e.g., routing device 103) may provide an SNMP query to CPE 104-*a* via network tunnel 102-*a*. In some other examples, provider site 101 (e.g., routing device 103) may provide an SNMP query to CPE 104-*b* via network tunnel 102-*b*. Responsive to the query, the corresponding CPE 104 may provide SNMP information. For example, CPE 104-*a* may provide SNMP information to routing device 103 via network tunnel 102-*a*. In some other examples, CPE 104-*b* may provide SNMP information to routing device 103 via network tunnel 102-*b*. SNMP information may include one or more ifIndex numbers of network interfaces. Security systems 111 may process and/or analyze received SNMP information received from routing device 103 (e.g., received via switch 109). For example, security systems 111 may correlate the ifIndex number(s) from the received SNMP information with the ifIndex number(s) contained within network packet header information (e.g., Netflow information). In some examples, a CPE 104 may provide particular ifIndex numbers responsive to particular SNMP queries from provider site 101.

CPEs 104 may use network tunnels 102 to receive and/or provide interface statistics to/from provider site 101 (e.g., routing device 103). Interface statistics may include bandwidth utilization information, packet information (e.g., number of packets being sent and/or received), error information (e.g., number of error packets being sent and/or received), discard packet information (e.g., number of packets that were dropped), collision information (e.g., number of instances where two devices attempted to transmit data at the same time), latency information, jitter information, throughput information, packet queue length information, availability information, status information, or the like, or a combination of these. Security systems 111 may process and/or analyze interface statistics received from routing device 103 (e.g., via switch 109) and use them to implement or improve security policies within provider network 105.

In some examples, routing device 103 may include a plurality of ports, each port corresponding to different types of customer network information received over network tunnels 102. For example, routing device 103 may be configured to receive network packet header information at a first port, receive SNMP information at a second port, receive interface statistics at a third port, and so on. In some cases, each customer may be assigned its own set of ports for different types of customer network information, or in some other cases, there may be ports configured to receive different types of customer network information regardless of which customer (e.g., which CPE 104, tunnel 102) that customer network information is coming from. For example, a first port may be configured to receive network packet header information from network tunnel 102-*a*, and another port may be configured to receive network packet header information from network tunnel 102-*b*. In some other examples, a first port may be configured to receive network packet header information from network tunnels 102-*a* and 102-*b*. Similar configurations may be applied for SNMP information, interface statistics, or other customer network information.

In some examples, routing device 103 may be configured with an access list or a policy (e.g., an access control list (ACL)) to accept (e.g., only accept) customer network information from certain ports. In some cases, other customer network information received by routing device 103 (e.g., customer network information from a network tunnel 102 that does not correspond to an established port for a particular type of customer network information) may be filtered out or dropped. In some other cases, such other customer network information may be provided to security systems 111, or to some other device or systems, and security systems 111 or the other device or systems may determine that the other customer network information is useful, and allow the customer network information for processing, or determine that the other customer network information is not useful, and drop the customer network information.

Some customers may want to selectively limit (e.g., allow, disallow, or a combination thereof) certain customer network information that is provided from or requests received by the customer at the CPE 104. For example, some customers may prefer to limit or eliminate SNMP-related communications (e.g., SNMP queries from the provider site 101 to the CPE 104, SNMP information provided from the CPE 104 to the provider site 101, or the like). The provider, or customer, or a combination of these, may be able to configure the CPE 104 to selectively limit and/or allow certain customer network information that is provided from the CPE 104 to the routing device 103 via the corresponding network tunnel 102, and/or selectively limit and/or allow certain queries for customer network information that is received by the CPE 104 from the routing device 103 via the corresponding network tunnel 102. For example, the CPE or provider network 105 may be configured to provide an interface to allow for the configuration of permitted or disallowed requests or customer network information that can be shared from CPE 104. In examples, the interface may comprise a user interface or customer portal. In other examples, the interface may comprise an application programming interface (API) to allow programmatic and/or automatic restrictions on such outgoing customer network information or incoming requests.

For example, a CPE 104 may be configured based on a selection from a customer. Provider network 105 may provide (e.g., automatically provide upon or during establishing the associated network tunnel 102) a configuration user interface (e.g., a menu with one or more selection boxes or options) to a customer device 110 (e.g., over a webpage, an email, or any other form of communication). A customer using the customer device 110 may make one or more selections of what kind of customer network information the customer will permit to be transmitted or requests received through the corresponding network tunnel 102. For example, a customer may select that they would like to eliminate SNMP queries and/or information transfer over the network tunnel 102, but allow network packet header information broadcasting and interface statistics communication. A customer via a customer device 110 may indicate the CPE 104 IP address to the provider site 101 in some cases. Provider site 101 may receive an indication of these selections (e.g., over the network tunnel 102, or over any other communication means). Based on the selections, provider site 101 may configure (e.g., automatically) the CPE 104 associated with the customer (e.g., configure using communications over the network tunnel 102, or using any other communication method). For example, the CPE 104 may be remotely configurable by the provider network 105 based on the customer selections. Based on the configuration, the CPE 104 may allow and/or disallow certain information to be transmitted and/or received by the CPE 104 over the network tunnel 102. In some cases, based on the received indication of the one or more selections, provider site 101 may allow (e.g., automatically) and/or disallow transmission of certain information to the CPE 104 over the associated network tunnel 102.

In some examples, a customer device 110 may configure a corresponding CPE 104 based on one or more selections from a customer. For example, CPE 104 may provide a configuration interface to a customer device 110. A customer using the customer device 110 may make one or more selections of what kind of customer network information they would like to be transmitted or requested through the corresponding network tunnel 102. For example, a customer may select that they would like to eliminate SNMP queries and/or information transfer over the network tunnel 102, but allow network packet header information broadcasting and interface statistics communication. In some cases, provider site 101 may receive an indication of these selections from CPE 104 (e.g., over the network tunnel 102, or over any other communication means). In some cases, a customer device 110 may use software to automatically configure the associated CPE 104 based on the one or more selections from the customer device 110. In some other cases, the CPE 104 may automatically configure itself based on receiving the one or more selections from the customer device 110. Based on the configuration, the CPE 104 may allow and/or disallow certain customer network information to be transmitted by, and/or requests received for, the network tunnel 102. In some cases, based on the received indication of the one or more selections, provider site 101 may limit and/or allow transmission of certain customer network information to the CPE 104 over the associated network tunnel 102.

Figure 2:
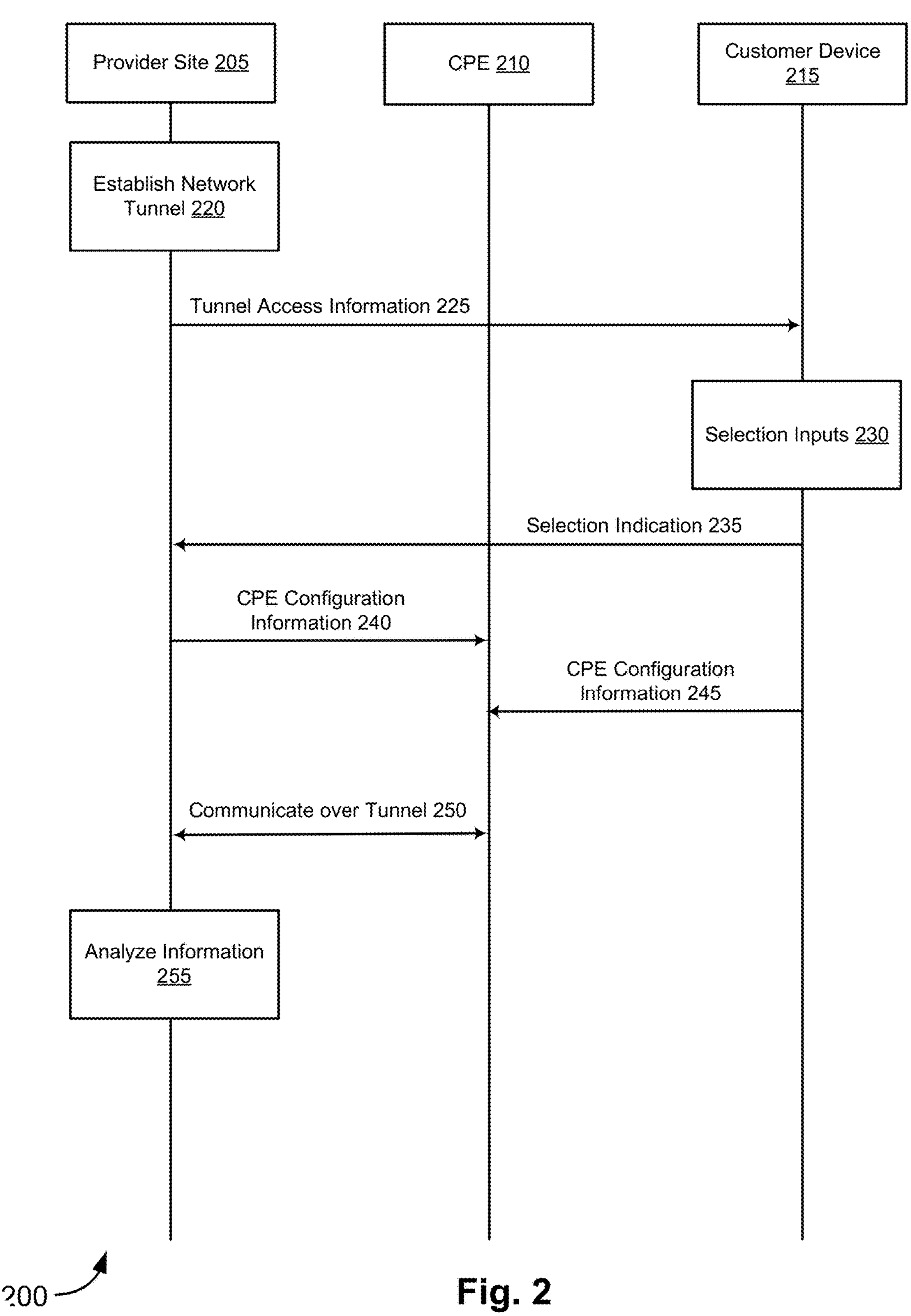
FIG. 2 is a process flow diagram depicting an example process flow according to aspects of the present application.

FIG. 2 discloses a process flow diagram 200 depicting an example process flow according to aspects of the present disclosure. In some examples, provider site 205 may include provider site 101. In some examples, CPE 210 may include a CPE 104. In some examples a customer device 215 may include a customer device 110.

Provider site 205 may establish a network tunnel 220. Provider site 205 may establish the network tunnel 220 between a routing device (e.g., routing device 103) of the provider site 205 and a CPE (e.g., a CPE 210). Establishing a network tunnel may include determining one or more internet protocol (IP) addresses for the network tunnel. For example, at least one device at provider site 101 may determine an IP address for the network tunnel at the network tunnel termination point (e.g., at routing device 103), determine an IP address for the network tunnel at the network tunnel origination point (e.g., CPE 210), and may determine an IP address corresponding to the network tunnel itself (e.g., may not be associated with a termination point or origination point).

Provider site 205 may provide tunnel access information 225 to customer device 215. In some examples, provider site 205 may provide a customer (e.g., a CPE 210, a customer device) (e.g., using an established corresponding network tunnel, or using any other infrastructure) a communication including information about the established network tunnel so the customer may be able to access the network tunnel. For example, the communication may include a secret or a key to access the corresponding network tunnel, an origination IP address for the network tunnel, a destination IP address for the network tunnel, and/or a third IP address corresponding to the network tunnel (e.g., but not associated with the origination or destination of the network tunnel). Using the received information, the customer may be able to access the corresponding network tunnel.

Customer device 215 may receive selection inputs 230 from a customer. For example, a customer may input the selection inputs onto a screen of the customer device 215, or any other input method. For example, provider site 205 may provide a configuration interface (e.g., a menu) for the customer to select, on the customer device 215, which types of customer network information they would like to allow or disallow for communication over the established network tunnel.

Customer device 215 may provide a selection indication 235 to provider site 205. The selection indication 235 may include one or more selections from the customer at 230.

In some cases, provider site 205 may provide CPE configuration information 240 to CPE 210. Provider site 205 may configure CPE 210 based on the selection indication 235. For example, if the selection inputs 230 are to allow network packet header information but disallow SNMP queries and SNMP information over the network tunnel, the provider site 205 may configure the CPE 210 to not transmit SNMP information, not accept SNMP queries, or both.

In some cases, customer device 215 may provide CPE configuration information 245 to CPE 210. Customer device 215 may configure CPE 210 based on the selection indication 235 (e.g., using software on the customer device 215). For example, if the selection inputs 230 are to allow network packet header information but disallow SNMP queries and SNMP information over the network tunnel, the provider site 205 may configure the CPE 210 to not transmit SNMP information, not accept SNMP queries, or both.

Provider site 205 and CPE 210 may communicate over the network tunnel 250 (e.g., based on the CPE 210 configuration). For example, if the CPE 210 has been configured by either the provider site 205 or the customer device 215 to allow providing SNMP information to the provider site 205 via the network tunnel and to allow SNMP queries, the CPE 210 may receive an SNMP query from the provider site 205 via the network tunnel, and CPE 210 may transmit corresponding SNMP information to the provider site 205 via the network tunnel.

Provider site 205 may analyze information 255. For example, security systems 111 included in provider site 205 may analyze received customer network information (e.g., network packet header information, SNMP information, interface statistics, or the like, or a combination of these) from CPE 210 via the network tunnel as previously described.

Figure 3:
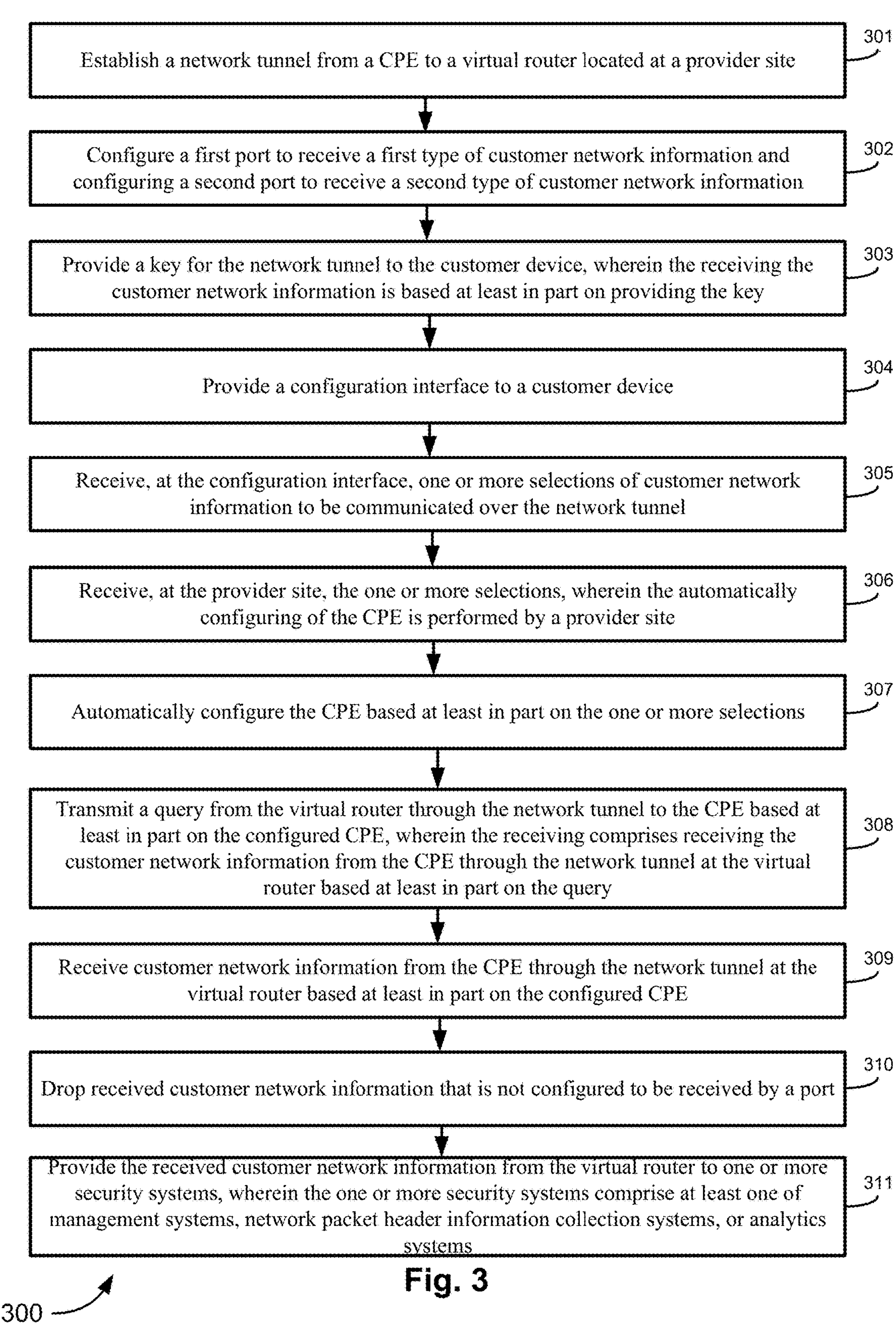
FIG. 3 is a flowchart depicting an example method according to aspects of the present application.

FIG. 3 illustrates an example method 300 in accordance with the present application. In examples, some or all of the operations of method 300 are performed by provider site 101 or 205 (or included devices), CPE 104 or 210, customer device 110 or 215, or a combination of these.

At operation 301, the method may include establishing a network tunnel from a CPE to a virtual router located at a provider site. For example, at least one device at provider site 101 may establish network tunnel 102-*a* between routing device 103 (e.g., a tunnel termination point, which may be a virtual router running on a hypervisor, or a physical routing device) and CPE 104-*a*.

At operation 302, the method may include configuring a first port to receive a first type of customer network information and configuring a second port to receive a second type of customer network information. For example, routing device 103 may be configured to receive network packet header information at a first port, receive SNMP information at a second port, receive interface statistics at a third port, and so on. In some cases, each customer may get its own set of ports for different types of customer network information, or in some other cases, there may be ports configured to receive different types of customer network information regardless of which customer (e.g., CPE 104, tunnel 102) that customer network information is coming from. For example, a first port may be configured to receive network packet header information from network tunnel 102-*a*, and another port may be configured to receive network packet header information from network tunnel 102-*b*. In some other examples, a first port may be configured to receive network packet header information from network tunnels 102-*a* and 102-*b*

At operation 303, the method may include providing a key for the network tunnel to the customer device, wherein the receiving the customer network information is based at least in part on providing the key. For example, provider site 205 may provide a customer (e.g., a CPE 210, a customer device) (e.g., using an established corresponding network tunnel, or using any other infrastructure) a communication including information about the established network tunnel so the customer may be able to access the network tunnel. For example, the communication may include a secret or a key to access the corresponding network tunnel, an origination IP address for the network tunnel, a destination IP address for the network tunnel, and/or a third IP address corresponding to the network tunnel (e.g., but not associated with the origination or destination of the network tunnel). Using the received information, the customer may be able to access the corresponding network tunnel.

At operation 304, the method may include providing a configuration interface to a customer device. For example, provider site 205 may provide a configuration interface (e.g., a menu) for the customer to select, on the customer device 215, which types of customer network information that will be allowed/disallowed for communication over the established network tunnel.

At operation 305, the method may include receiving, at the configuration interface, one or more selections of customer network information to be communicated over the network tunnel. For example, a customer may input (e.g., on a touchscreen, a mouse and keyboard configuration, or the like) the selections on a menu interface indicating which customer network information the customer will allow/disallow for communication over the network tunnel.

At operation 306, the method may include receiving, at the provider site, the one or more selections, wherein the automatically configuring of the CPE is performed by a provider site. For example, provider site 101 may receive the one or more selections (e.g., over the network tunnel or via another method of communication).

At operation 307, the method may include automatically configuring the CPE based at least in part on the one or more selections. For example, a device at provider site 101 may configure the CPE 104 from which it received the selections from based on the one or more selections. In some other examples, a customer device 110 may configure an associated CPE 104 based on the one or more selections.

At operation 308, the method may include transmitting a query from the virtual router through the network tunnel to the CPE based at least in part on the configured CPE, wherein the receiving comprises receiving the customer network information from the CPE through the network tunnel at the virtual router based at least in part on the query. For example, the query may be an SNMP query, and the received customer network information based on the query may be SNMP information from a CPE 104.

At operation 309, the method may include receiving customer network information from the CPE through the network tunnel at the virtual router based at least in part on the configured CPE. For example, routing device 103 may receive network packet header information, SNMP information, interface statistics, or the like, or a combination of these, from a CPE 104 over the corresponding network tunnel 102, depending on which kinds of customer network information are allowed/disallowed by the CPE 104 configuration for communication over the network tunnel 102.

At operation 310, the method may include dropping received customer network information that is not configured to be received by a port. For example, ports of routing device 103 may be configured to receive certain types of customer network information (e.g., network packet header information at a first port, SNMP information at a second port, interface statistics at a third port). In some cases, customer network information that does not corresponding to those types of customer network information, and thus those ports, may be dropped.

At operation 311, the method may include providing the received customer network information from the virtual router to one or more security systems, wherein the one or more security systems comprise at least one of management systems, network packet header information collection systems, or analytics systems. For example, routing device 103 may provide, via switch 109, network packet header information, SNMP information, interface statistics, or the like, or a combination thereof, received from a CPE 104 via an associated network tunnel 102, to security systems 111 for processing and/or analysis.

Figure 4:
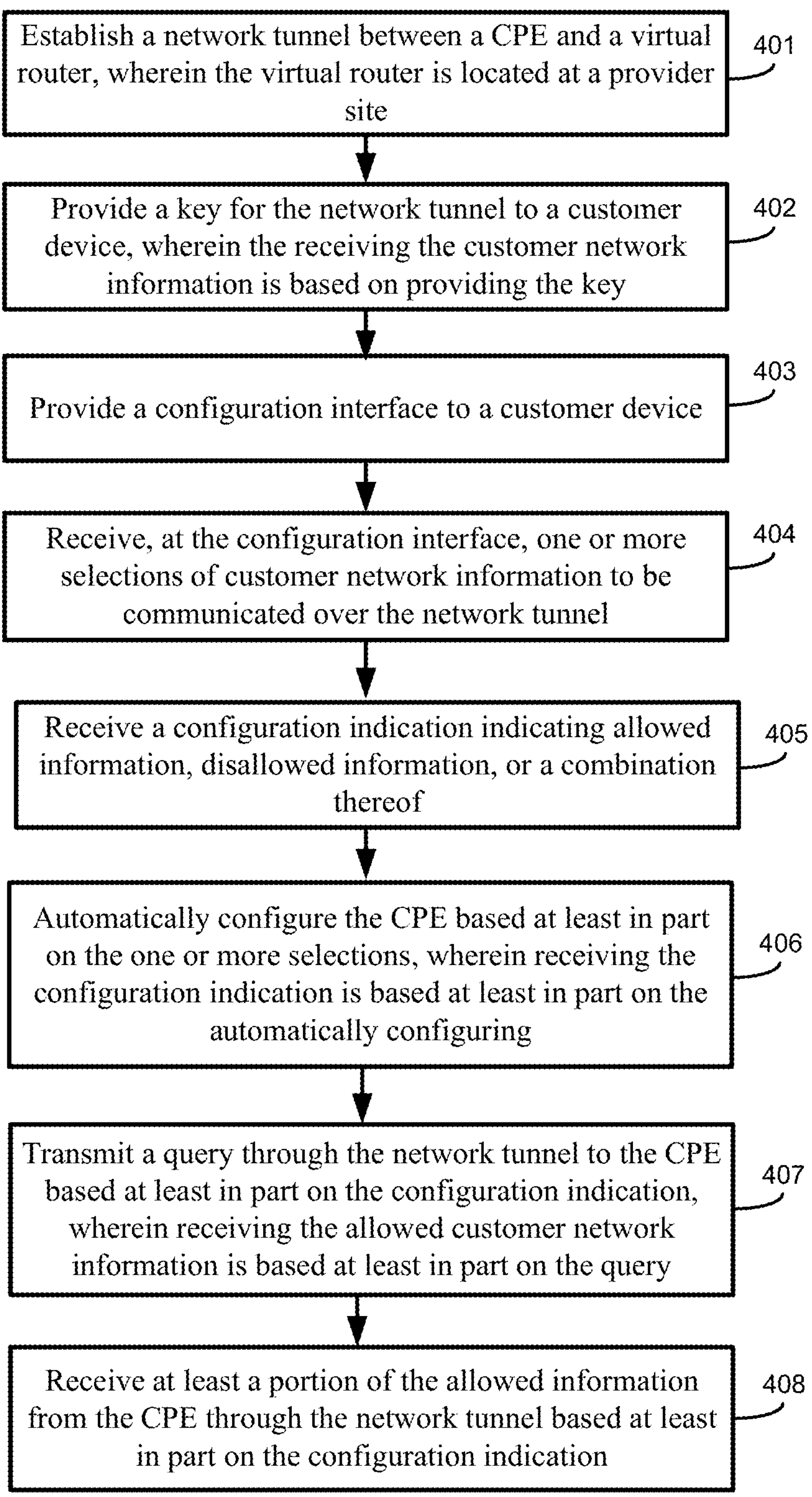
FIG. 4 is a flowchart depicting an example method according to aspects of the present application.

FIG. 4 illustrates an example method 400 in accordance with the present application. In examples, some or all of the operations of method 400 are performed by provider site 101 or 205 (or included devices), CPE 104 or 210, customer device 110 or 215, or a combination of these.

At operation 401, the method may include establishing a network tunnel between a CPE and a virtual router, wherein the virtual router is located at a provider site. For example, at least one device at provider site 101 may establish network tunnel 102-*a* between routing device 103 (e.g., a tunnel termination point, which may be a virtual router running on a hypervisor, or a physical routing device) and CPE 104-*a*.

At operation 402, the method may include providing a key for the network tunnel to a customer device, wherein the receiving the allowed customer network information is based at least in part on providing the key. For example, provider site 101 may provide a customer (e.g., a CPE 104, a customer device 110) (e.g., using an established corresponding network tunnel 102, or using any other infrastructure) a communication including information about the established network tunnel so the customer may be able to access the network tunnel. For example, the communication may include a secret or a key to access the corresponding network tunnel 102, an origination IP address for the network tunnel, a destination IP address for the network tunnel, and/or a third IP address corresponding to the network tunnel (e.g., but not associated with the origination or destination of the network tunnel).

At operation 403, the method may include providing a configuration interface to a customer device. For example, provider site 101 may provide (e.g., automatically provide upon or during establishing the associated network tunnel 102, or manually provide) a configuration interface to a customer device 110 (e.g., over a webpage, an email, or any other form of communication) (e.g., over the network tunnel 102, or over any other communication means).

At operation 404, the method may include receiving, at the configuration interface, one or more selections of customer network information to be communicated over the network tunnel. For example, a customer using the customer device 110 may make one or more selections of what kind of information the customer would prefer to be transmitted or received through the corresponding network tunnel 102.

At operation 405, the method may include receiving a configuration indication indicating allowed customer network information, disallowed customer network information, or a combination thereof, for communication through the network tunnel. For example, provider site 101 may receive an indication of these selections (e.g., over a webpage, an email, or any other form of communication) (e.g., over the network tunnel 102, or over any other communication means).

At operation 406, the method may include automatically configuring the CPE based at least in part on the one or more selections, wherein receiving the configuration indication is based at least in part on the automatically configuring. For example, based on the selections, provider site 101 or a customer device 110 may configure (e.g., automatically or manually configure) the CPE 104 associated with the customer (e.g., configure using communications over the network tunnel 102, or not over the network tunnel 102).

At operation 407, the method may include transmitting a query through the network tunnel to the CPE based at least in part on the configuration indication, wherein receiving the allowed customer network information is based at least in part on the query. For example, provider site 101 may provide an SNMP query via a network tunnel 102 to a CPE 104, and provider site 101 (e.g., routing device 103) may receive SNMP information from the CPE 104 based on the SNMP query.

At operation 408, the method may include receiving at least a portion of the allowed customer network information from the CPE through the network tunnel based at least in part on the configuration indication. For example, the provider site 101 (e.g., routing device 103) may receive network packet header information, SNMP information, interface statistics, or the like, provided that such customer network information is allowed to be transmitted by the CPE 104 according to the configuration of the CPE 104.

Figure 5:
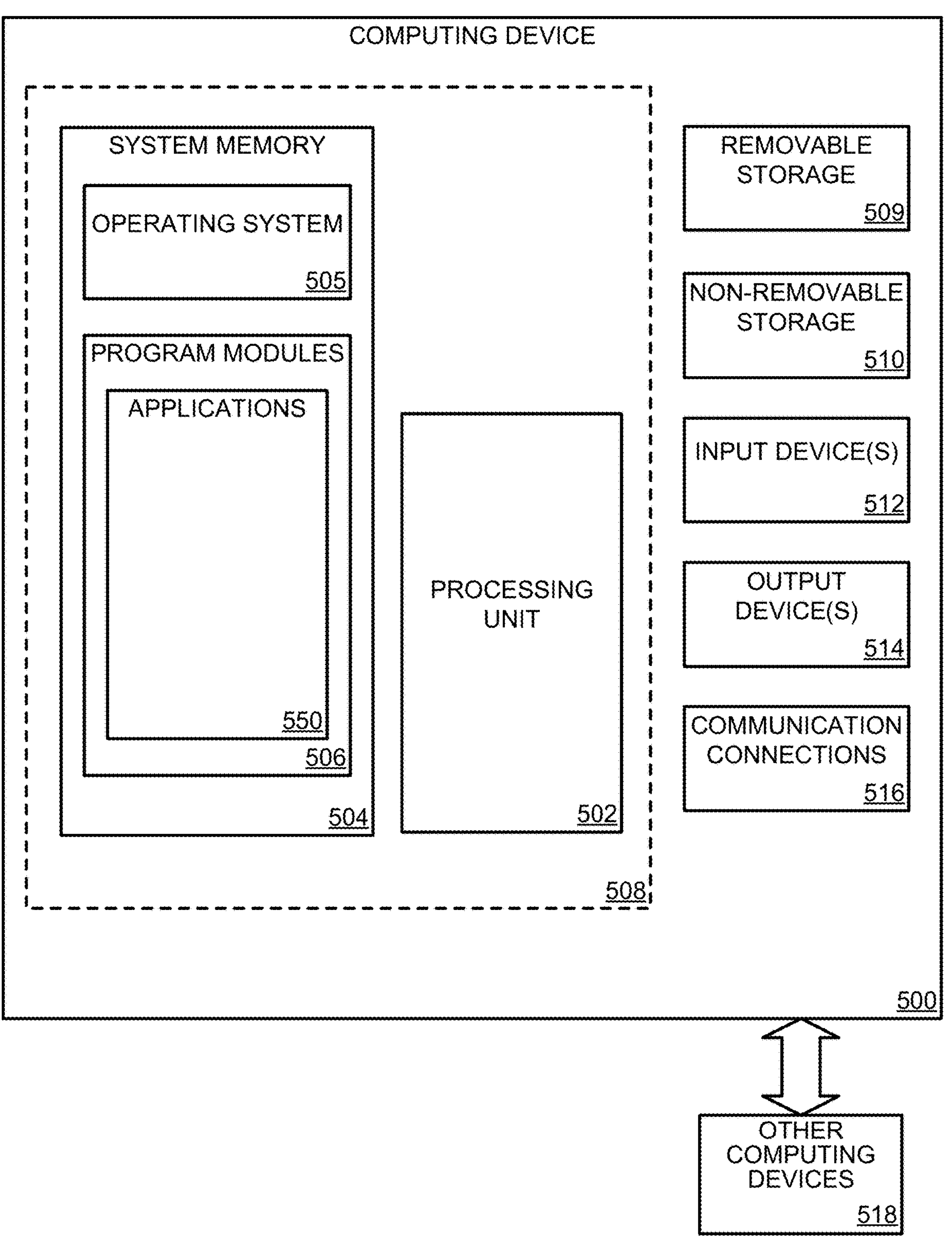
FIG. 5 is a block diagram depicting an example computing environment in which systems and methods of the present application may be implemented.

FIG. 5 is a block diagram illustrating physical components (i.e., hardware) of a computing device 500 with which examples of the present disclosure may be practiced. The computing device components described below may be suitable for a client device implanting one or more of devices included in provider site 101 or 205, routing device 108, routing device 103, security systems 111, switch 109, PEs 107, CPEs 104 or 210, customer devices 110 or 215, or other components of FIGS. 1-2. In a basic configuration, the computing device 500 may include at least one processing unit 502 and a system memory 504. The processing unit(s) (e.g., processors) may be referred to as a processing system. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 550 to implement one or more of the systems described above with respect to FIGS. 1-2.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, one or more of the operations of the methods illustrated in FIGS.

3-4. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media may be non-transitory and tangible and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:

establishing a network tunnel from a customer premises equipment (CPE) to a virtual router located at a provider site;

providing a configuration interface accessible by a customer device;

providing a key for the network tunnel to the customer device;

receiving, via the configuration interface, one or more selections of customer network information to be communicated over the network tunnel made using the configuration interface on the customer device;

automatically configuring the CPE based at least in part on the one or more selections; and receiving customer network information from the CPE through the network tunnel at the virtual router based at least in part on the configured CPE and further based at least in part on providing the key.

2. The method of claim 1, further comprising:

receiving, at a computing device of the provider site, the one or more selections, wherein the automatically configuring of the CPE is performed by the computing device at the provider site.

3. The method of claim 1, wherein the automatically configuring of the CPE is performed by the customer device.

4. The method of claim 1, further comprising:

transmitting a query from the virtual router through the network tunnel to the CPE based at least in part on the configured CPE, wherein the receiving customer network information comprises receiving the customer network information from the CPE through the network tunnel at the virtual router based at least in part on the query.

5. The method of claim 1, wherein receiving customer network information from the CPE comprises receiving customer network information over a plurality of networks, and wherein the receiving comprises a one-hop communication over the plurality of networks.

6. The method of claim 1, wherein receiving customer network information from the CPE comprises receiving customer network information comprising at least one of network packet header information, simple network management protocol (SNMP) information, or interface statistics.

7. The method of claim 1, wherein the establishing the network tunnel network further comprises configuring the network tunnel with an internet protocol security (IPSec) framework.

8. The method of claim 1, further comprising:

providing the received customer network information from the virtual router to one or more security systems, wherein the one or more security systems comprise at least one of management systems, network packet header information collection systems, or analytics systems.

9. The method of claim 1, wherein establishing the network tunnel further comprises determining a first internet protocol (IP) address corresponding to the virtual router, determining a second IP address corresponding to the CPE, and determining a third IP address corresponding to the network tunnel.

10. The method of claim 1, further comprising:

configuring a first port of the virtual router to receive a first type of information;

configuring a second port of the virtual router to receive a second type of information; and dropping received customer network information that is not the first type of information or the second type of information.

11. A method, comprising:

establishing a network tunnel between a customer premises equipment (CPE) and a virtual router, wherein the virtual router is located at a provider site;

providing a key for the network tunnel to a customer device;

receiving a configuration indication indicating allowed customer network information, disallowed customer network information, or a combination thereof, for communication through the network tunnel; and receiving at least a portion customer network information from the CPE through the network tunnel based at least in part on the configuration indication and further based at least in part on providing the key.

12. The method of claim 11, further comprising:

providing a configuration interface to a customer device;

receiving, at the configuration interface, one or more selections of customer network information to be communicated over the network tunnel made using the configuration interface on the customer device; and automatically configuring the CPE based at least in part on the one or more selections, wherein receiving the configuration indication is based at least in part on the automatically configuring.

13. The method of claim 12, wherein the automatically configuring of the CPE is performed by a computing device at the provider site.

14. The method of claim 12, wherein the automatically configuring of the CPE is performed by the customer device.

15. The method of claim 11, further comprising:

transmitting a query through the network tunnel to the CPE based at least in part on the configuration indication, wherein receiving the allowed customer network information is based at least in part on the query.

16. The method of claim 15, wherein the query comprises a simple network management protocol (SNMP) poll, wherein the allowed customer network information comprises SNMP information, and wherein receiving the allowed customer network information is based at least in part on the SNMP poll.

17. The method of claim 11, wherein the configuration indication indicates disallowing simple network management protocol (SNMP) queries to be provided from the provider site, and disallowing SNMP information to be provided from the CPE.

18. A system, comprising:

a processor; and a memory operatively connected to the processor and storing instructions that, when executed by the processor, cause the system to perform a method, the method comprising:

establishing a network tunnel from a customer premises equipment (CPE) to a virtual router at a provider site;

providing a configuration interface accessible to a customer device;

providing a key for the network tunnel to the customer device;

receiving, at the configuration interface, one or more selections of customer network information to be communicated over the network tunnel made using the configuration interface on the customer device;

automatically configuring the CPE based at least in part on the one or more selections; and receiving customer network information from the CPE through the network tunnel at the virtual router based at least in part on the configured CPE and further based at least in part on providing the key.

* * * * *